Oct. 12, 1926.

L. PIERCE 1,602,550

ROLLING MILL FOR FORMING PIPE COUPLINGS

Filed June 11, 1925  2 Sheets-Sheet 1

INVENTOR
*L. Pierce*
BY
*F. Ledermann*
ATTORNEY

Oct. 12, 1926.　　　　　　　　　　　　　　　　　1,602,550
L. PIERCE
ROLLING MILL FOR FORMING PIPE COUPLINGS
Filed June 11, 1925　　2 Sheets-Sheet 2
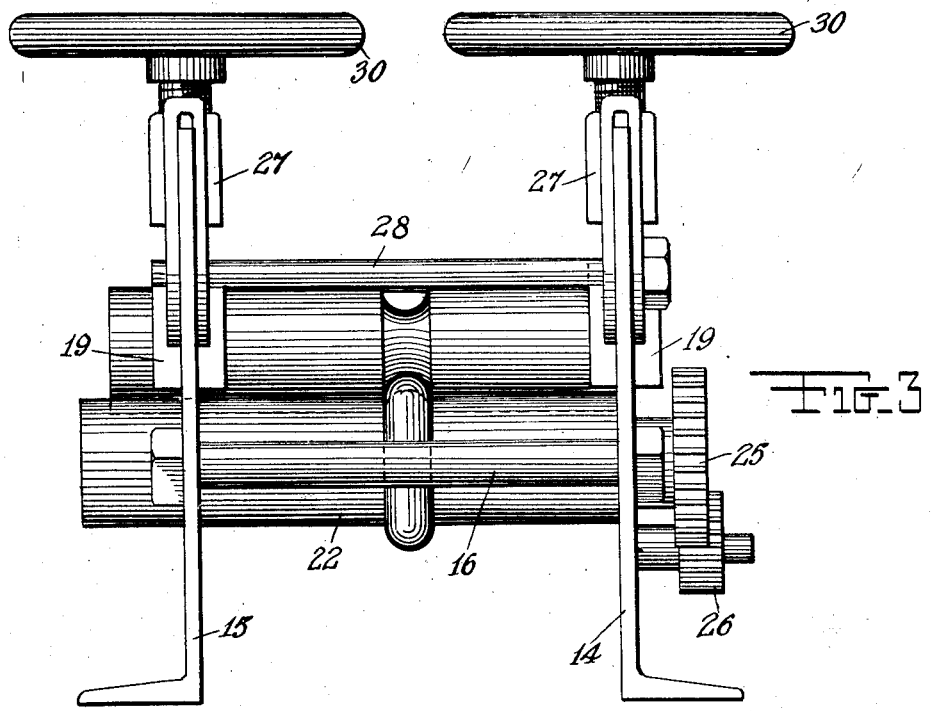
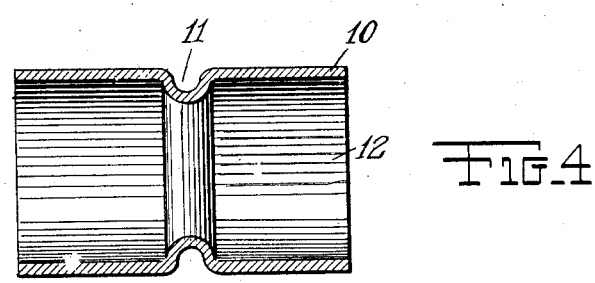
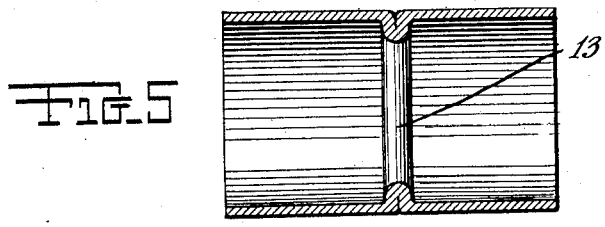
INVENTOR
L. Pierce
BY
ATTORNEY Patented Oct. 12, 1926.

1,602,550

UNITED STATES PATENT OFFICE.

LEON PIERCE, OF NEW YORK, N. Y.

ROLLING MILL FOR FORMING PIPE COUPLINGS.

Application filed June 11, 1925. Serial No. 36,311.

The main object of the invention is to provide a rolling mill by which means the internal encircling shoulder is formed on circular pipes.

The above and other objects will become apparent in the description below, in which characters of reference refer to like-named parts in the drawing.

Referring briefly to the drawing, Figure 1 is a front elevational view of the rolling mill by which means I propose to form internal flanges upon a length of pipe to provide a flanged coupling.

Figure 3 is an end elevational view of the rolling mill.

Figure 4 is a longitudinal sectional elevational view, showing a length of pipe, after having flange operation performed thereon in the rolling mill.

Figure 5 is the final completed pipe coupling.

Figure 1:
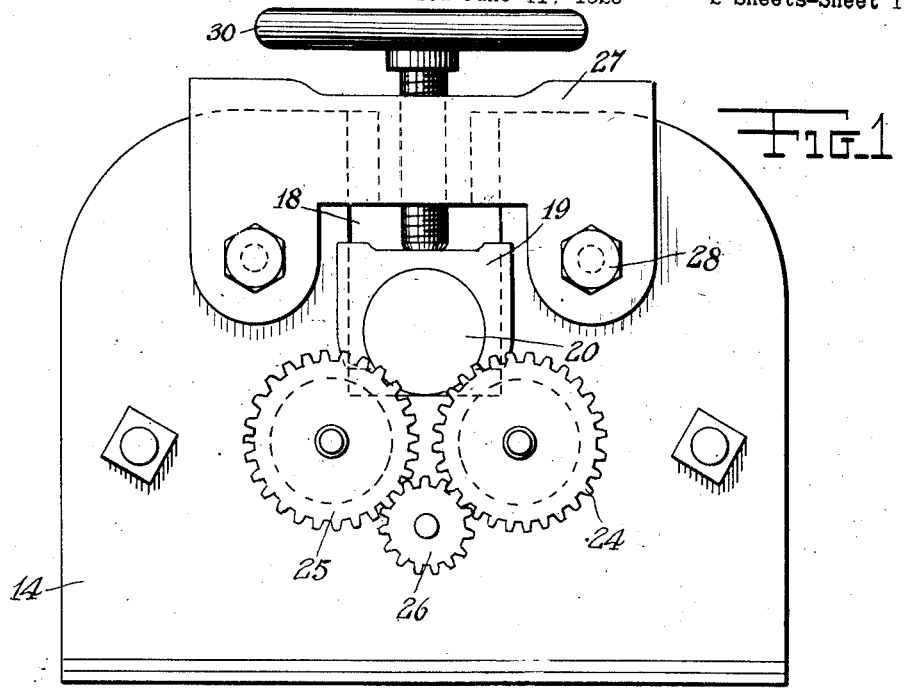
Figure 2:
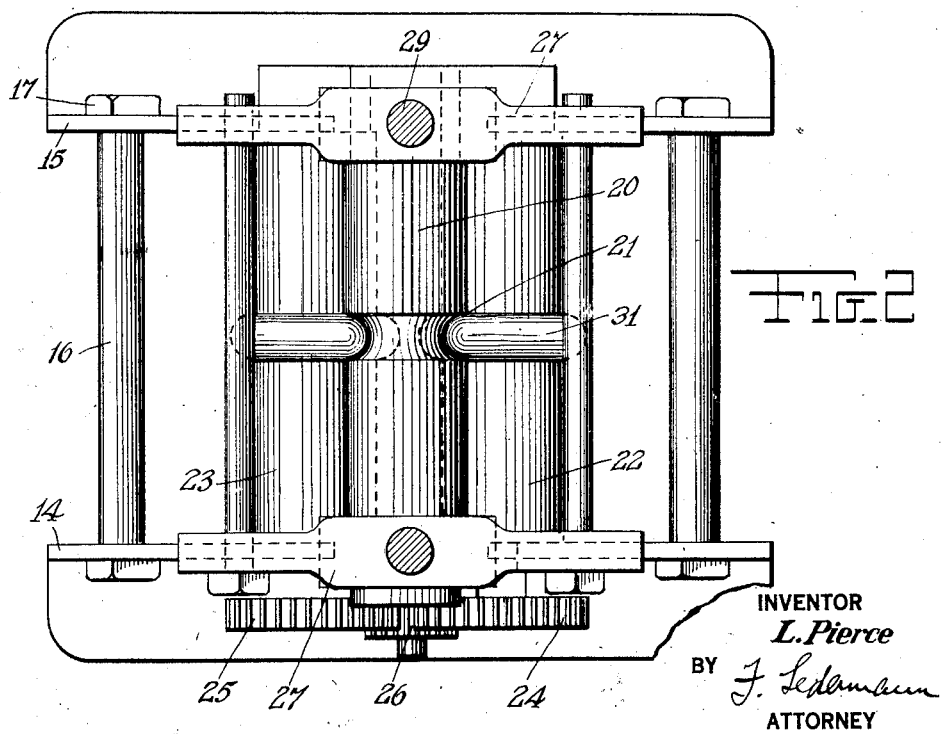
Figure 2 is a top plan view of the same with the adjusting hand wheels cut away.

Referring in detail to the drawing, the numeral 10 indicates a cylindrical pipe. This pipe I propose to construct of a nominal length and at a position intermediate its length, I form a semi-circular depression 11 either externally or internally, as desired, an internal depression being shown in Figure 4. By forming this annular depression 11, a width of material is formed into a semi-circular internal or external outline by being subjected to pressure in a rolling mill illustrated in the accompanying views. The length of pipe is then subjected to end pressure from both ends so that the depression 11 is closed and the semi-circular deformed portion 12 is formed into opposing flat shoulders 13, as illustrated in Figure 5. These shoulders are formed to provide seats for the ends of pile pipes which are commonly used at the present time in the construction of piers in foundation work.

The rolling mill consists of a pair of plates 14 and 15 which are spaced-apart from each other and are connected by tie-rods 16 which are firmly bolted in place after passing thru holes in the stand plates 14 and 15 by nuts 17. These stand plates 14 and 15 are provided with cut-out portions 18 and the edges bounding these cut-out portions serve as guides for grooved bearing blocks 19 which are capable of vertical movement in the cut-out portions 18. Within these bearing blocks 19, the ends of an idler roll 20 are rotatable. Intermediate the length of the idler roll 20, a semi-circular cut-out portion 21 is formed. Beneath the idler roll and on both sides thereof, a pair of additional flange forming rolls 22 and 23 are provided which are permanently journalled in the stand plates 14 and 15 by passing thru holes thereon. One of the ends of the flange forming rolls 22 and 23 is reduced in diameter and projects somewhat from the exterior face of the stand plate 14. To these projecting ends, gears are secured. A relatively strong gear 24 is secured to the end of the roll 22 and an additional gear 25 of the same dimensions as the gear 24, is secured to the projecting end of the roll 23. These gears are connected in mesh by a small pinion 26 which is rotatably mounted on the stand plate 14 beneath the rolls 22 and 23. The pinion gear 26 is fixedly mounted on a rotatable stud, said stud projecting from the face of the pinion and providing a means of anchoring a pulley when the rolling mill is to be motor driven, or a crank handle when it is to be manually rotated. A plate yoke 27 cradles on the stand plates 14 and 15 and closes the cut-out portions 18 at the top. These yokes are held in place by stay bolts 28 which span the distance between the stand plates 14 and 15 and are adapted to be slipped from place when the yoke members 27 are to be removed to uncover the cut-out portions 18. Each of these yoke members has a screw 29 passing vertically downward, said screw having a hand wheel 30 secured to its upper end.

The rolling mill is designed to form an internal semi-circular shoulder upon a sleeve or length of pipe at a position intermediate its length, as illustrated in Figure 4. To insert a sleeve which has not been deformed, as illustrated in Figure 4, the stay bolts 28 are removed and the yokes 27 are lifted in order to uncover the cut-out portions 18. When these cut-out portions are uncovered, the bearing blocks 19 are lifted upwardly until said bearing blocks may be slipped from the ends of the idler roll 20 upon which a plain length of pipe is then placed. After the plain pipe has been slipped over the idler roll 20, the yokes 27 are attached so that the bearing blocks rest in the cut-out portions 18. The idler roll is then forced downwardly by rotating the hand wheels 30 and screws 29. By rotating these screws and hand wheels, the idler roll is urged downwardly and the bulged portions 31 provided on the forming rolls 22 and 23 then form the semi-circular deformation on the sleeve, as these bulging portions 31 on the rolls 22 and 23 cooperate with the annular cut-out portion 21 of the idler roll by registering in said portion 21. It is to be noted that the idler roll 20 may be conveniently interchanged with any other size of roll to form seats or internal flanges upon lengths of pipe or tubing of various sizes. It is also to be understood that the roll 20 is of smaller size than the interior dimension of the shoulder formed in the sleeve so that the sleeve may be readily removed from the idler roll when the flange has been formed thereon. After the sleeve has been deformed into a member having an internal semi-circular deformed portion 12, the sleeve is placed under a press or similar machine and pressure is exerted thereon from both ends toward the center so that the semi-circular depression 11 is flattened into position, as shown in Figure 5.

I claim:—

1. A rolling mill comprising a pair of spaced-apart stand plates, a pair of forming rolls, semi-circular bulging portions on said forming rolls, a gear secured to each forming roll, a driving pinion meshing with said gears, an idler roll having a semi-circular cut-out portion on its periphery aligned with the bulging portions of the forming rolls, bearing blocks slidable vertically in said stand plates, yokes mounted on said stand plates, and hand wheels removably mounted on said yokes for urging the idler roll into cooperating engagement with the forming rolls.

2. A rolling mill comprising a pair of spaced-apart stand plates, a pair of forming rolls, semi-circular bulging portions on said rolls, a gear secured to each forming roll, a driving pinion meshing with said gears, an idler roll cooperating with the forming rolls, said stand plates having vertical channels therein open at the top, blocks slidable vertically in said channels, yokes removably mounted on said stand plates covering the open ends of said channels, and hand wheels rotatably and removably mounted on said yokes for urging the idler roll into cooperating engagement with the forming rolls.

3. A rolling mill comprising a pair of spaced-apart stand plates, a pair of forming rolls, semi-circular bulging portions on said forming rolls, a gear secured to each forming roll, a driving pinion meshing with said gears, an idler roll cooperating with the forming rolls, said stand plates having vertical channels therein open at the top, blocks slidable vertically in said channels, yokes removably mounted on said stand plates covering the open ends of said channels, said yokes being secured at both ends, one of said securing means when removed permitting rotation of said yokes to expose the open end of the channel for removal of the vertically sliding blocks mounted in said stand plates, said yokes turning said hand wheels 90 degrees to a position where they are disengaged from the slide blocks.

In testimony whereof I affix my signature.

LEON PIERCE.